INVENTOR:
EINAR BAGGE-LUND.

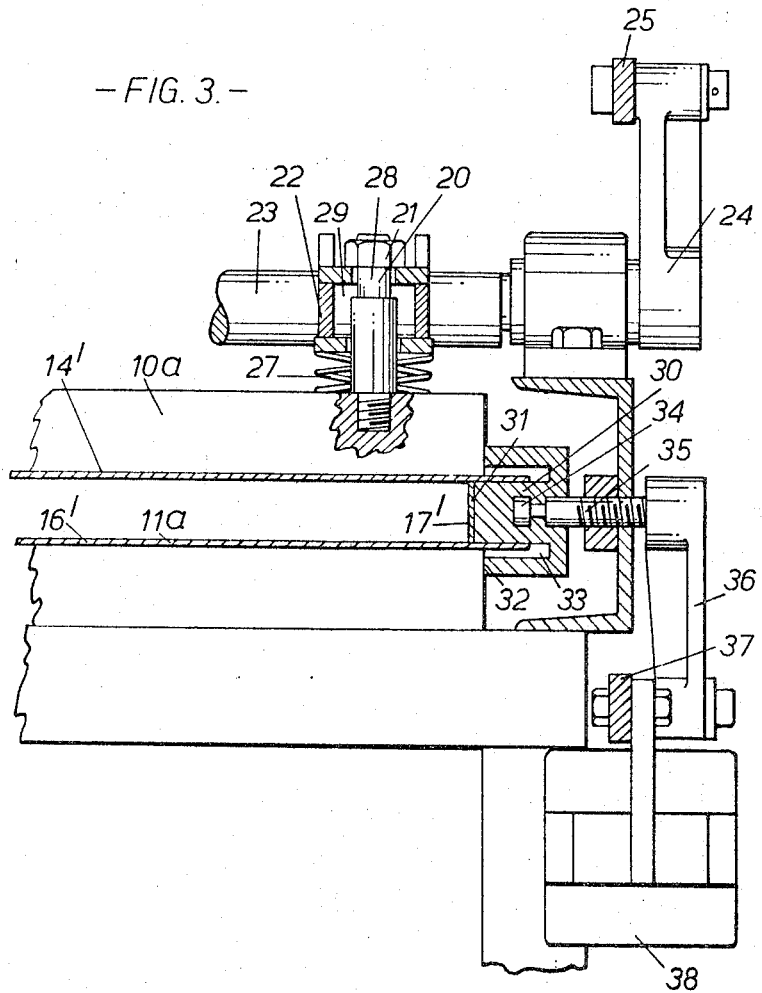

United States Patent Office 3,300,994
Patented Jan. 31, 1967

3,300,994
FREEZING OF FOODSTUFFS
Einar Bagge-Lund, Bergen, Norway, assignor to Fiskeridirektoratets Kjemisk-Tekniske Forskningsinstitutt, Bergen, Norway
Filed Nov. 17, 1964, Ser. No. 411,734
7 Claims. (Cl. 62—63)

This invention relates to freezing foodstuffs such as fish fillets, whale meat and like articles of food of irregular shape, which on being suitably pressed together are frozen fast to one another by being conveyed through a freezing zone.

It is known to produce articles of food in the form of a continuous chain by forcing the foodstuffs into a freezing unit between stationary freezing mould surfaces, freezing the foodstuffs, thawing the frozen chain of food from the freezing mould surfaces and thereafter forcing the food chain out of the freezing unit.

The main object of the invention is to provide a process whereby one can freeze articles of food to form an unbroken chain in a more economic and continuous manner.

According to present invention a process for moulding and freezing together articles of food comprises introducing the articles into one end of an elongated passage defined by juxtaposed surfaces which both mould and convey the articles through said passage, causing said food-moulding surfaces to pass through a freezing zone resulting in indirect heat-transfer between the articles and the freezing zone, and collecting the frozen articles issuing as a continuous chain from the other end of the passage.

Preferably a resilient or yielding pressure is exerted on the food in the freezing zone and across the path of movement thereof, while it has been found particularly convenient to advance the food-moulding surfaces step-by-step between separate freezing operations, said surfaces being pressed against the articles before and during each freezing operation and relieved of pressure subsequent to each freezing operation. Moreover, it has been found desirable to carry out the freezing operation for each portion of the resultant food chain in several stages, whereby the chain is produced in steps corresponding to the steps of the freezing operation.

The invention also includes an apparatus specifically adapted for carrying out the novel process and which comprises a plurality of endless conveyor belts arranged in juxtaposition to define an elongated passage through which the articles of food can be moulded and drawn on driving said belts, means for simultaneously driving said conveyor belts, a freezing unit having upper and lower portions formed with passages for the continuous flow of freezing fluid, said upper and lower portions each presenting a cooled plane surface to a corresponding one of the conveyor belts whereby heat-transfer is permitted to occur indirectly between the articles and the cooled surfaces, and means for supplying cooling fluid to said upper and lower portions.

In order that the invention can be more easily understood, a process will be described along with a convenient embodiment of the apparatus, by way of example, with reference to the accompanying drawings in which:

FIGURE 3 is a scrap-section of the apparatus shown in FIGURES 1 and 2.

Figure 1:
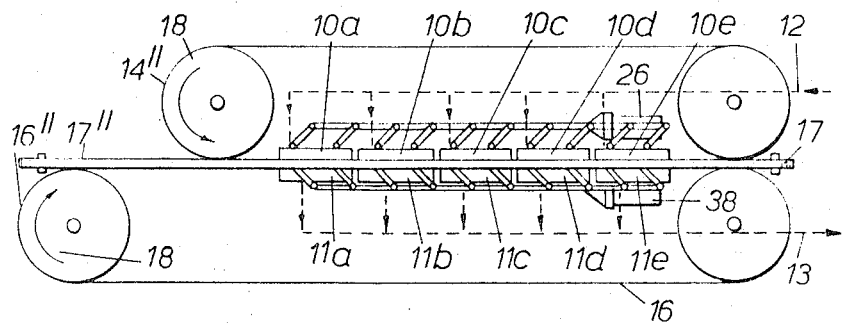
FIGURE 1 is a side view of the apparatus shown largely schematically.

Referring to the drawings, the freezing unit of the apparatus consists of an upper portion 10 and a lower portion 11, each divided into sections 10a, 10b, 10c, 10d and 10e and 11a, 11b, 11c, 11d and 11e respectively, which are provided with individual passages for the flow of the freezing medium. Conduits 12 and 13 are connected to each section of the portions 10 and 11 by means of branch conduits 12', 13' and 12", 13" respectively. The branch conduits 12', 12", 13' and 13" can, if desired, be provided with manual control valves.

The upper portion 10 of the freezing unit illustrated is divided up into separate parts corresponding to the said sections 10a, 10b etc. and arranged as closely together as possible. The lower portion 11 of the freezing unit is constructed as a rigid unit. The surfaces of the portions 10, 11 of the freezing unit which are directed towards one another, are plane and extend substantially parallel to one another.

Figure 2:
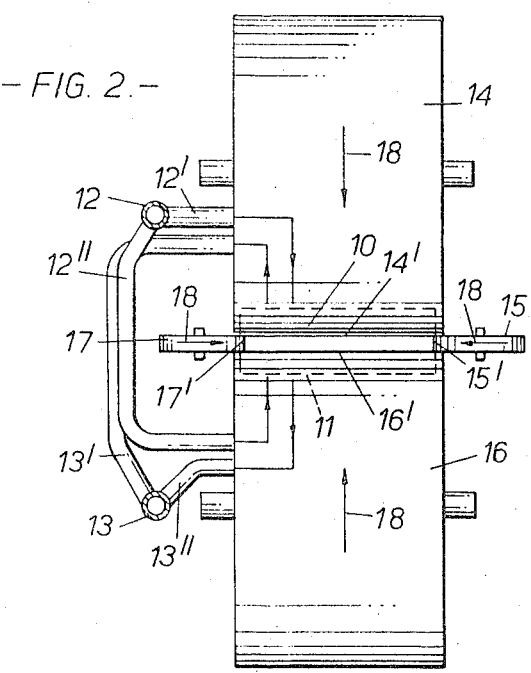
FIGURE 2 is a view of the apparatus as seen from the delivery end.

Along the freezing unit, there are mounted four endless synchronised conveyor belts 14, 15, 16 and 17 which are formed of thin strips of stainless steel. As is evident from FIGURE 2, a rectangular cross-section is defined which corresponds substantially to the cross-sectional form of the block of food (for example, 30 x 400 mm.) between opposed and adjacent runs 14', 15', 16' and 17' of the corresponding conveyor belts. The conveyor belts are provided with stretching means (not shown) for regulating the tension in the conveyor belts.

The arrows 18 indicate the driving direction of the conveyor belts. Two of the conveyor belts 14, 16 are relatively broad and extend with their one run, 14' and 16' respectively, directly against the portions 10 and 11 of the freezing unit. The conveyor belts 14 and 16 are extended laterally outside the freezing unit. The two remaining conveyor belts 15, 17 are essentially narrower and are arranged transversely between the runs 14', 16', a distance within the edge portions and just inside the outer edge portions of the freezing unit. The conveyor belts 15, 17 thus constitute the lateral limit of the freezing zone. The upper conveyor belt 14 is somewhat shorter than the other conveyor belts 15, 16, 17 so that forwardly of the front end 14" of the conveyor belt 14, there is formed a channel between the front ends 15", 16", 17" of the conveyor belts 15, 16, 17, for charging food articles which are to be conveyed through the freezing unit.

The upper portion of the freeze unit which is divided into separate units 10a, 10b etc. is adapted to be moved towards and away from the lower run 14' of the upper conveyor belt, partly in order to expose the block of food to pressure during freezing and partly in order to bring the conveyor belts 14, 16 into good heat-conducting communication with the food and the freezing unit.

In order to be able to freeze the food to a continuous chain and as an even and compact mass, it is necessary that the food articles be supplied in abundant quantity and desirable that they be exposed to pressure both before and during the freezing operation, so that air can be driven out which has collected in pockets between the articles of food and so that the food can be brought tightly together in order to give heat-conducting connection between the articles and in order to freeze them together as a continuous chain. It is possible to establish a certain pre-pressure on the articles during charging thereof between the conveyors, while during freezing, the goods expand somewhat thus forming a separate pressure.

The freezing operation is carried out in several stages, for example, in five consecutive stages for each portion of the food block. In each of the first four stages, the chain of food is permitted, by means of yielding pressure, to expand in suitable stages to approximately the final thickness of the food chain, while in the last stage there is no expansion (all the water is frozen) and the final thickness is obtained. During the various stages of the freezing operation, the upper portion 10 of the freezing unit in pressed downwards towards the run 14' in order to ensure heat-conducting communication between the food and the freezing unit above the runs 14' and 16'. After carrying out a stage of the freezing operation, the pressure is relieved from the portion 10 which is raised upwards a few millimeters, so that a clearance between the conveyor belts 14, 16 and freezing unit is provided.

It is an advantage that the cross-section between the portions 10 and 11 be small, so that there is relatively little expansion of the food in a direction between the portions of the freezing unit, thereby making it easy to maintain the food chain at a substantially uniform cross-section along the whole of its length. With respect to the necessary clearance between the side conveyor belts 15, 17 and guide rails 30, when the conveyor belts are to be moved forward, the runs 15', 17', are pressed somewhat inwards towards the chain of food just before the freezing operation begins, so that the necessary clearance will be obtained on releasing the pressure against belts 15, 17 after carrying out a stage of the freezing operation.

The conveyor belts 14–17 are moved forward as a unit bearing tightly against the chain of food. As a consequence of the said clearance this unity can be produced relatively unhindered from section to section in step with the stage-wise freezing operation.

In FIGURE 3, pressure-producing means for the conveyor belts 14, 16 and 17 are illustrated. Each section, such as the section 10a shown in the upper portion of the freezing unit, is suspended by four bolts 20 which are fixed at their lower ends to the section 10a and at their upper ends by nuts 21, so that it can be supported in an elevating platform 22 which is secured at each end to an eccentrically mounted elevating shaft 23. Each elevating shaft 23 spans the apparatus and supports its two bolts 20, being driven by a crank arm 24 of a common link rod 25 which is actuated by an air-pressure cylinder 26 (FIGURE 1). Between the platform 22 and the section 10a, there is installed a spring 27 which consists of conical discs directed in pairs towards one another and designed to accommodate large pressures with little movement. At the top of the bolt, there is arranged a guide 28 between the nut 21 and a shoulder 29.

The guide rails 30 are disposed with a plane portion 31 against the conveyor belts 15, 17 respectively and with outwardly disposed stop portions 32 against the sections 10a, 11a etc., so that the plane central portion 31 is guided into position at a definite distance within the edges of the sections. Between the plane central portion 31 and the stop portion 32, there are arranged deep grooves 33 for the reception of the edge portions of the belts 14, 16, so that they can be permitted to wander a small distance laterally of the freezing unit, at the same time as irregularities are compensated for in the shaping of the edges of the belts. To the guide rails 30, there is secured one end 34 of a series of spindles 35 which pivot about their respective link arms 36. The link arms 36 are secured to a common rod 37 which is actuated by a pressure cylinder 38. The end of the spindle 34 is provided with a head which is received in the guide rail 30 in a manner not further shown.

An air-pressure cylinder 38 with associated rod 37 and link arms 36 is arranged on each side of the apparatus.

By leading articles of food through the apparatus according to the above-described embodiment, they can be permitted to freeze fast to the food-moulding surfaces without effecting the operation of the surfaces, since the latter can be arranged so as to slide comparatively undisturbed against the freezing unit itself or against the controls thereof. Possible loosening of the food chain from the food-moulding surfaces after they have passed the freezing zone of the freezing unit, can be allowed to take place at a distance from the freezing unit so that no interference effects are obtained between the unit and the thawing zone. Thawing can be effected, if desired, as a result of the frozen food chain passing a thawing zone during passage from the freezing zone towards the delivery end of the apparatus.

What I claim is:

1. A process for moulding and freezing together irregularly shaped articles of food which comprises the steps of
    introducing the articles into an elongated passage having a plurality of successive freezing zones therein,
    conveying the articles to a first zone of said freezing zones to be frozen therein,
    simultaneously compressing and freezing the articles in said first zone,
    subsequently releasing the pressure on the frozen articles to permit expansion of the water therein,
    advancing the partially frozen articles to a second zone of said freezing zones to be frozen therein,
    simultaneously compressing and freezing the partially frozen articles in said second zone,
    conveying the frozen articles out of said second zone, and
    collecting the frozen articles issuing from said passage as a continuous chain.

2. A process as set forth in claim 1 wherein the articles are resiliently compressed in said first and second zones during said steps of simultaneously compressing and freezing.

3. A process according to claim 1 which further comprises the step of thawing the frozen food at a position remote from the freezing zone.

4. An apparatus for moulding and freezing together irregularly shaped articles of food to form a continuous chain which comprises first and second pairs of opposed endless conveyor belts having a predetermined tension and arranged in juxtaposition to define an elongated passage of substantially rectangular cross-section through which said articles can be moulded and drawn on driving said belts, a freezing unit having upper and lower portions formed with passages for the continuous flow of cooling fluid, means for supplying cooling fluid to said upper and lower portions, guide means disposed between the upper and lower portions at each end of the freezing unit, means for reciprocating at least one of the upper and lower portions of the freezing unit in a direction at right angles to the plane of a corresponding one of the first pair of conveyor belts and means for reciprocating each of the guide means substantially simultaneously to said portion in a direction at right angles to the plane of a corresponding one of the second pair of conveyor belts, the latter pair of belts being narrower than the first pair of belts, and said upper and lower portions each presenting a cooled plane surface to contact a parallel surface of a corresponding one of the first pair of belts and said guide means each presenting a plane surface to contact a parallel surface of a corresponding one of the second pair of belts.

5. An apparatus according to claim 4, wherein the upper and lower portions of the freezing unit are located wholly within the edges of the first pair of conveyor belts, which edges are arranged outwardly of the edges of the second pair of conveyor belts.

6. An apparatus for moulding and freezing together irregularly shaped articles of food to form a continuous chain which comprises first and second pairs of opposed endless conveyor belts having a predetermined tension and arranged in juxtaposition to define an elongated passage of substantially rectangular cross-section through which said articles can be moulded and drawn on driving said belts, a freezing unit having upper and lower portions formed with passages for the continuous flow of cooling fluid, means for supplying cooling fluid to said upper and lower portions, guide means disposed between the upper and lower portions at each end of the freezing unit, said upper portion of the freezing unit being made up of a plurality of independent cooling sections, eccentrically mounted common shafts spring-loadedly supporting said cooling sections, means for driving said shafts to cause said sections to be reciprocated in a direction at right angles to the plane of the upper portion's conveyor belt and means for reciprocating each of the guide means substantially simultaneously to said sections in a direction at right angles to the plane of a corresponding one of the second pair of conveyor belts, the latter pair of belts being narrower than the first pair of belts, said cooling sections presenting plane surfaces for exerting yielding pressure on a parallel surface of the upper portion's conveyor belt, said lower portion presenting a cooled plane surface to contact its conveyor belt and said guide means each presenting a plane surface to contact a parallel surface of a corresponding one of the second pair of belts.

7. An apparatus according to claim 6, wherein each guide means comprises a rail having a plane central portion, projecting between the upper and lower portions of the freezing unit, for bearing against a corresponding one of the second pair of conveyor belts and stop portions on each side of said central portion for abutting said upper and lower portions, each stop portion forming a groove with said central portion for the reception of an edge of a corresponding one of the first pair of conveyor belts and the means for reciprocating said guide means being adapted to move the rails so that the central portions bear against the second pair of conveyor belts just prior to the cooling sections of the upper portion bearing against the conveyor belt thereof.

References Cited by the Examiner

UNITED STATES PATENTS

| | | | |
|---|---|---|---|
| 1,822,124 | 9/1931 | Birdseye | 62—341 X |
| 2,070,850 | 2/1937 | Trabold. | |
| 2,392,695 | 1/1946 | Rohdin. | |
| 2,479,871 | 8/1949 | Scriven | 62—341 X |
| 2,602,304 | 7/1952 | Randell | 62—345 |
| 2,631,440 | 3/1953 | Pold | 62—341 X |
| 2,981,307 | 4/1961 | Malarkez | 100—154 |
| 3,063,362 | 11/1962 | Guettler | 100—118 X |

ROBERT A. O'LEARY, *Primary Examiner.*

W. E. WAYNER, *Assistant Examiner.*